United States Patent [19]
Connor

[11] Patent Number: 5,873,612
[45] Date of Patent: Feb. 23, 1999

[54] WINDOW LATCHING ARRANGEMENT

[75] Inventor: Alan R. Connor, Raleigh, N.C.

[73] Assignee: Caterpillar Inc., Peoria, Ill.

[21] Appl. No.: 551,087

[22] Filed: Oct. 31, 1995

[51] Int. Cl.⁶ .................................................. E05C 17/44
[52] U.S. Cl. .......................................... 292/338; 296/190
[58] Field of Search ............................... 292/338, DIG. 6, 292/DIG. 7; 49/142, 163, 169, 170; 296/190, 146.1

[56] References Cited

U.S. PATENT DOCUMENTS

| | | | |
|---|---|---|---|
| 1,557,927 | 10/1925 | Farley . | |
| 2,093,182 | 9/1937 | Anderson | 292/128 |
| 3,966,245 | 6/1976 | Losenno | 292/202 |
| 4,074,788 | 2/1978 | Joubert | 49/142 |
| 4,133,574 | 1/1979 | Martin | 296/28 C |
| 4,518,195 | 5/1985 | Tindall et al. | 296/148 |
| 4,758,032 | 7/1988 | Tindall | 292/265 |
| 5,076,637 | 12/1991 | Larkin et al. | 296/190 |
| 5,282,661 | 2/1994 | Arnberger | 296/27 |
| 5,286,073 | 2/1994 | Ui | 292/216 |
| 5,365,706 | 11/1994 | Elsenpeter et al. | 49/169 |

FOREIGN PATENT DOCUMENTS

| | | | |
|---|---|---|---|
| 3337297 | 5/1985 | Germany | 292/338 |
| 1342993 | 10/1987 | U.S.S.R. | 292/338 |
| 1015997 | 1/1966 | United Kingdom | 292/DIG. 6 |

*Primary Examiner*—Rodney M. Lindsey
*Attorney, Agent, or Firm*—Claude F. White

[57] ABSTRACT

A window latching arrangement for the first and second window portions of an operator's compartment of a work machine includes an access door housing the first window portion, first and second latching assemblies, each associated with the respective first and second window portions, and a plurality of lock and release mechanisms associated with the first and second window portions. The first window portion is pivotably connected to the access door for opening movement independent of the access door. The first and second window portions can open and pivot one toward the other and the first and second latching assemblies will engage and hold the window portions together until one of the latching assemblies is released.

12 Claims, 6 Drawing Sheets

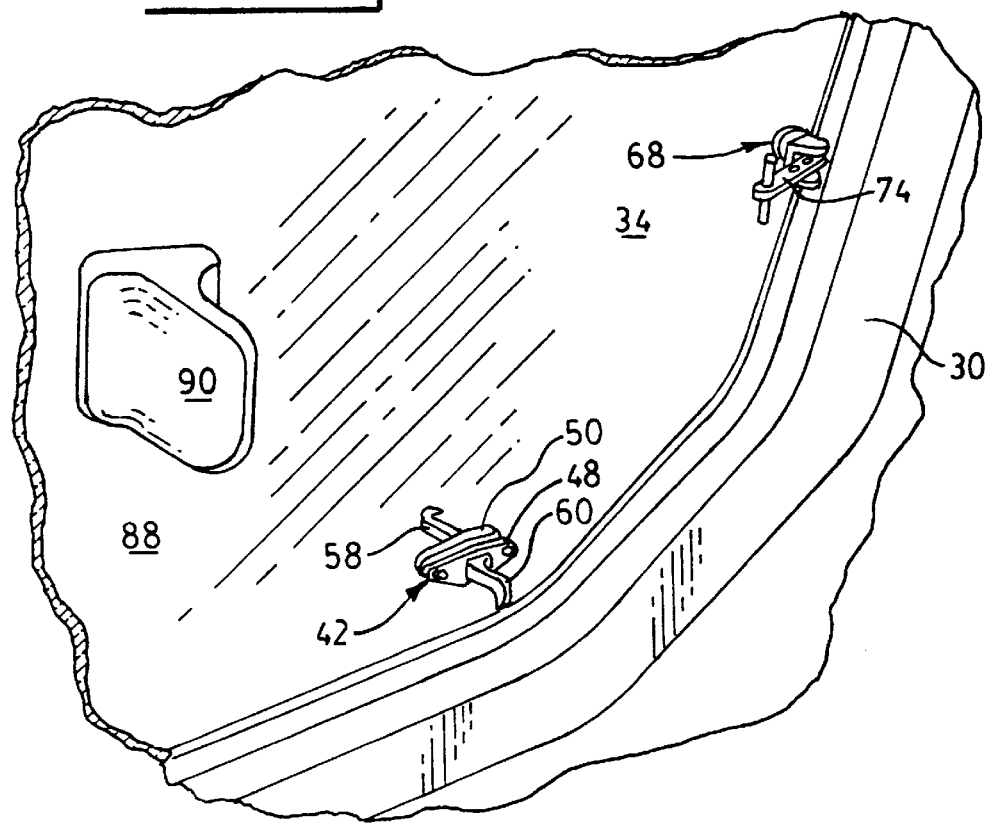
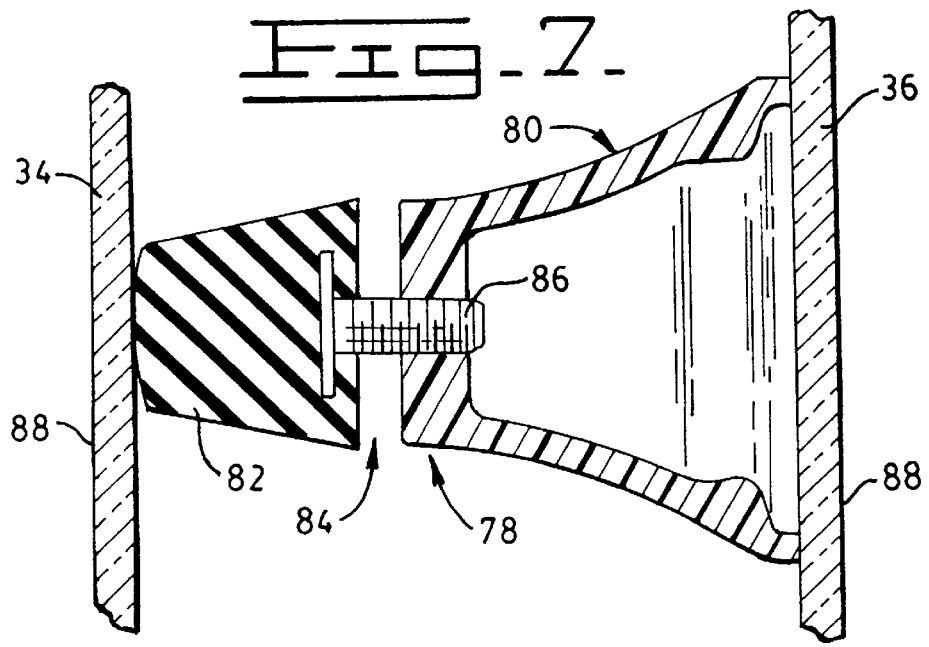

5,873,612

WINDOW LATCHING ARRANGEMENT

TECHNICAL FIELD

This invention relates generally to a window latching arrangement and more particularly to such an arrangement wherein various windows of a work machine can be latched in an open position.

BACKGROUND ART

Earthmoving and construction machines, such as backhoe loaders, wheel loaders, excavators, and other machines operate outdoors and normally include an enclosed cab or operator compartment. Although most cabs are provided with means to heat and cool the interior of the cab, in certain weather conditions the machine operator prefers to have the doors or windows open when operating the work machine, However, many work machines do not provide windows which open separately from the door. With such machines, the operator must open the door to admit outside air to the cab interior. Since the machines operate over rough and uneven ground surfaces, the door is often subjected to undesirable motion. In view of this, the machine operator may leave the door closed even though he would prefer to have outside air enter the interior of the cab.

The present invention is directed to overcoming one or more of the problems as set forth above.

DISCLOSURE OF THE INVENTION

In one aspect of the present invention, a work machine includes an operator's compartment having an access door pivotably connected thereto with the access door having a first window portion pivotably connected to the door for opening movement separately from the door, and a window latching arrangement for latching the window in an open position. The operator's compartment further includes a second window portion and the latching arrangement includes a first latching assembly connected to the first window portion and a second latching assembly connected to the second window portion.

Certain work machines, such as backhoe loaders, have a first work implement at the front of the machine and a second different type of work implement at the rear of the machine. The operator faces forward when operating the first work implement and faces rearward when operating the second implement. It is desirable that the machine operators be able to open a window at each operating position, and be able to securely latch the window in the open position.

The subject window latching arrangement offers a solution to the problems of windows being opened on a work machine and being securely held in the open position.

BRIEF DESCRIPTION OF THE DRAWINGS

FIG. 5 is a diagrammatic perspective view of a portion of a window and frame assembly, including a latching assembly of the subject invention;

FIG. 7 is an enlarged diagrammatic sectional view of a resilient bumper assembly of the present invention.

BEST MODE FOR CARRYING OUT THE INVENTION

Figure 1:
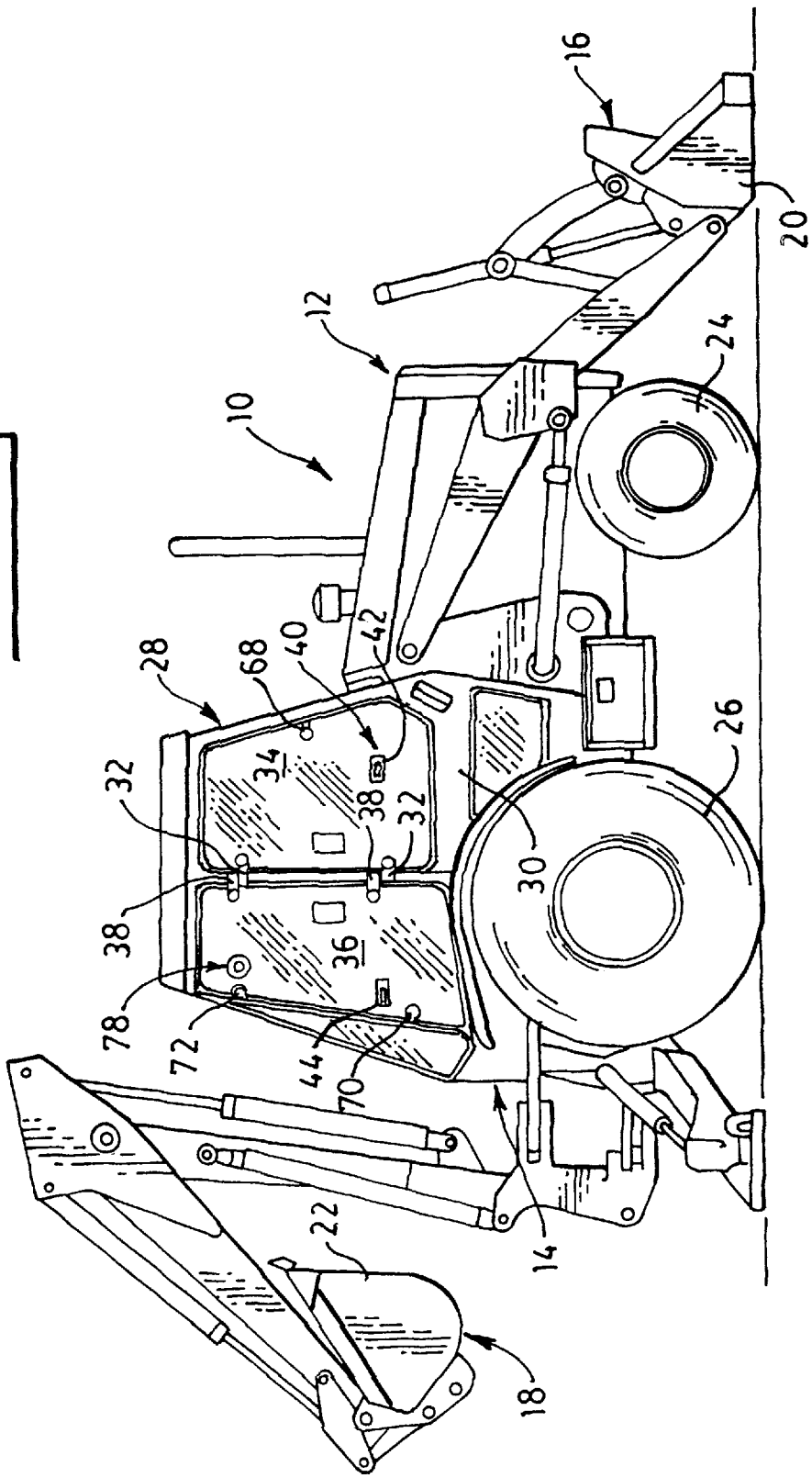
FIG. 1 is a diagrammatic side elevational view of a work machine incorporating the subject invention.
Figure 2:
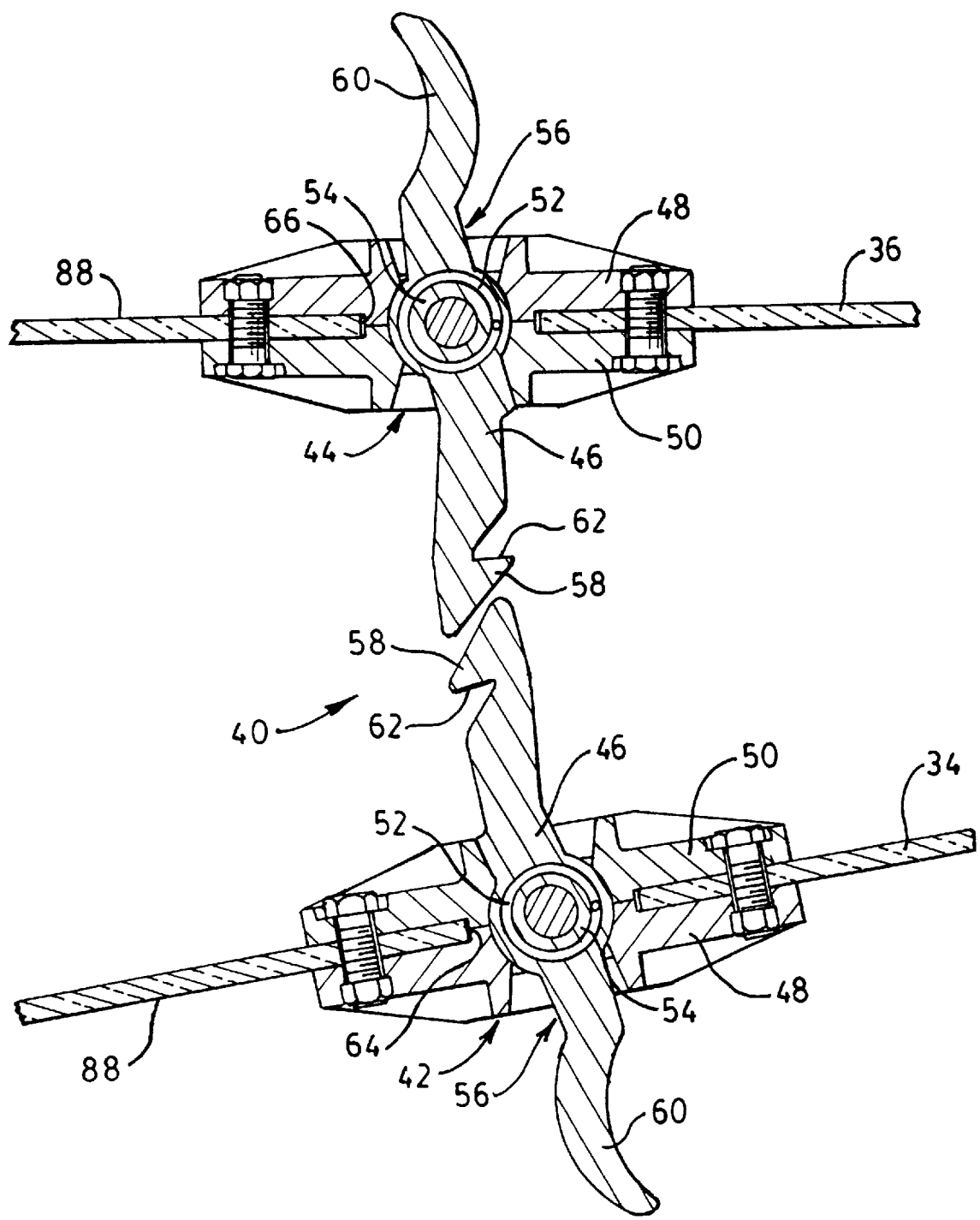
FIG. 2 is an enlarged diagrammatic sectional view of the subject latching assemblies just prior to engagement.
Figure 3:
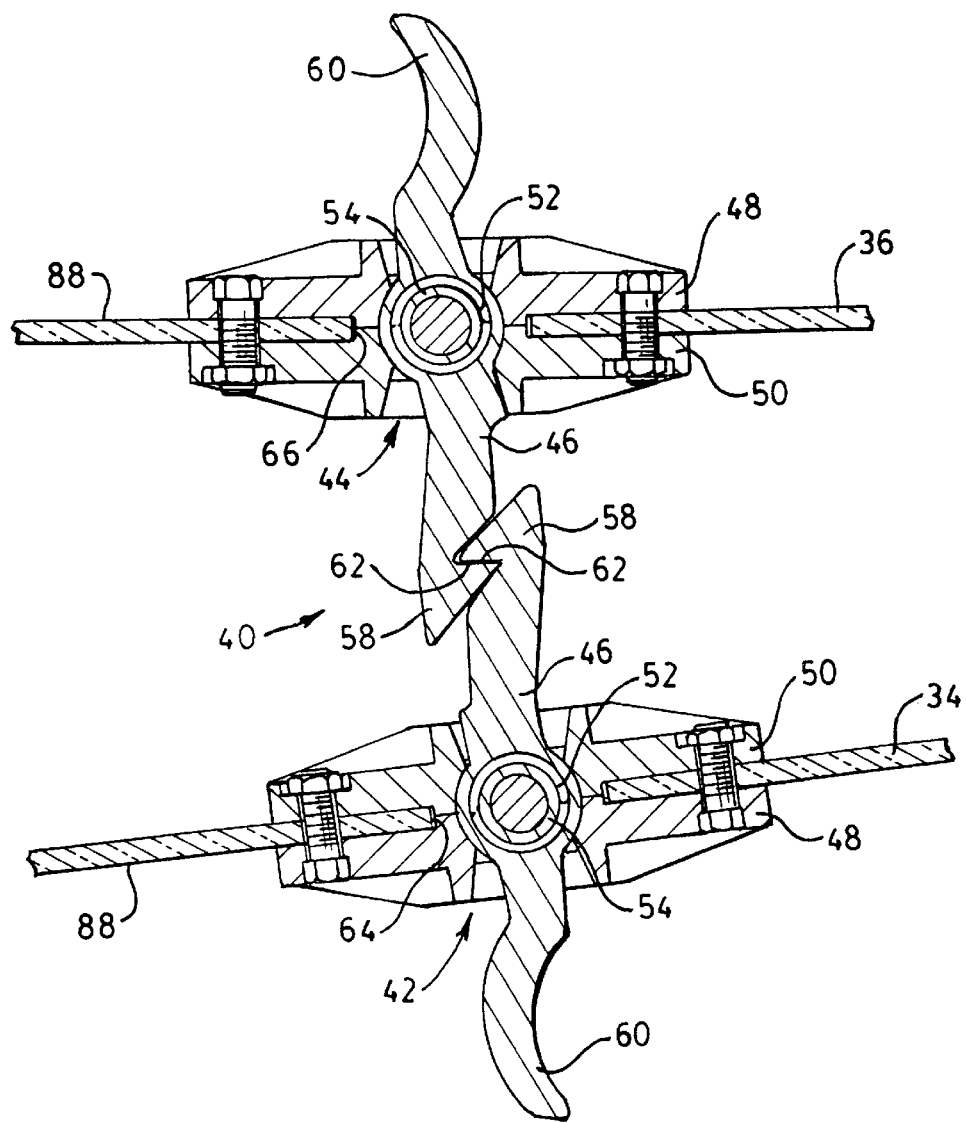
FIG. 3 is an enlarged diagrammatic sectional view, similar to FIG. 2, with the subject latching assemblies engaged and locked together.
Figure 4:
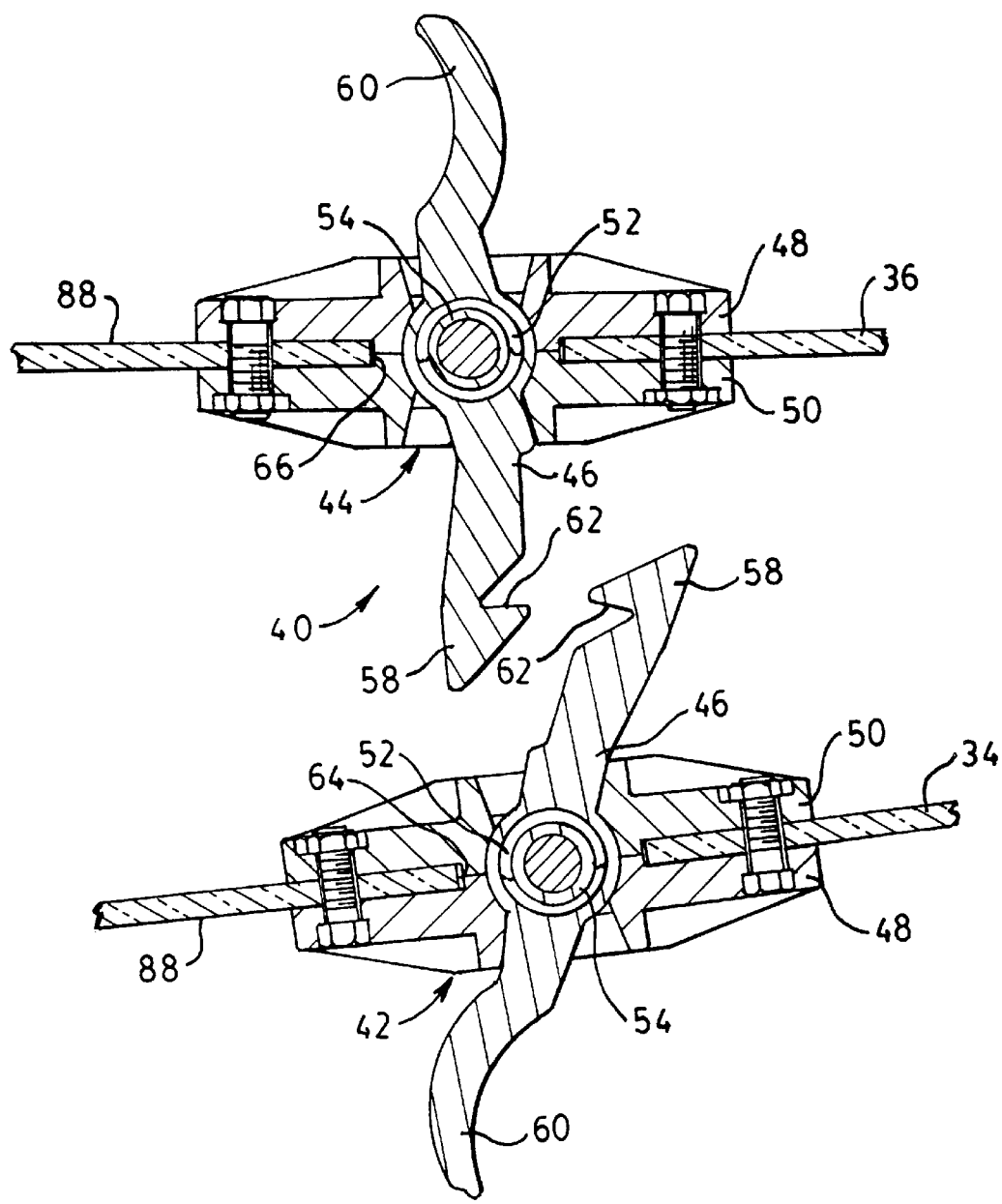
FIG. 4 is an enlarged diagrammatic sectional view, similar to FIG. 3, with the subject latching assemblies unlocked and disengaged.
Figure 6:
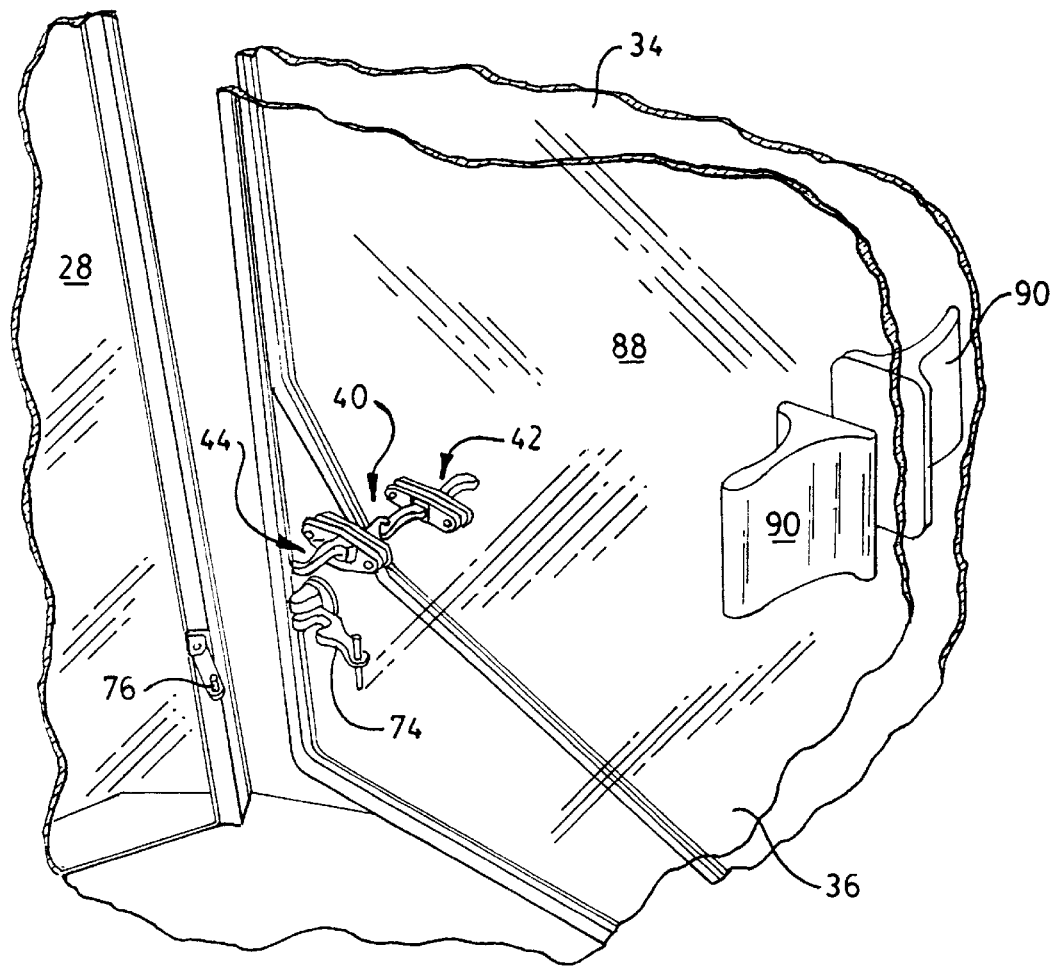
FIG. 6 is a diagrammatic perspective view of a portion of a frame assembly and two windows latched together by the subject latching assemblies.

With reference to the drawings, a work machine 10, such as a backhoe loader 10, has front and rear portions 12,14 with a first work implement 16 connected to the front portion 12, and a second work implement 18 connected to the rear portion 14. On the work machine illustrated, the first work implement 16 is a bucket 20, and the second work implement 18 is a backhoe digging device 22. The work machine includes front and rear wheels 24,26 and an operator's compartment 28 positioned substantially above the rear wheels 26 and adjacent the rear portion 14.

An access door 30 is pivotably connected to the operator's compartment 28 by a plurality of first hinges 32. The access door 30 includes a first window portion 34 which is pivotably connected to the door 30 for opening movement independent of the door 30. A second window portion 36 is pivotably connected to the operator's compartment 28 by a plurality of second hinges 38. The first window portion 34 is adapted to be opened and swing toward the second window portion 36 when the first work implement 16 is being operated and the second window portion 36 is adapted to be opened and swing toward the access door 30 and the first window portion 34 when the second work implement 18 is being operated. A window latching arrangement 40 provides for latching of the first and second window portions 34,36 together when one of the window portions 34,36 is opened and pivoted toward the other window portion 34,36.

The window latching arrangement 40 includes first and second latching assemblies 42,44 which are connected to the respective first and second window portions 34,36. The first and second latching assemblies 42,44 are in substantial horizontal alignment with each other to provide interlocking engagement when either of the first and second window portions 34,36 are opened and pivoted, one toward the other. The first and second latching assemblies 42,44 are substantially similar with each latching assembly 42,44 including a lever 46, first and second clamping blocks 48,50, and a spring 52, such as a coiled torsion spring. The spring 52 is adapted to encircle a central portion 54 of each lever 46 and bias the lever 46 toward a first position 56. Each lever 46 has a latching portion 58 and a release portion 60. Each latching portion 58 includes a notched area 62, with the notched area 62 of one lever 46 being adapted to engage and lock with the notched area 62 of the other lever 46 when one of the first and second window portions 34,36 is opened toward the other of the first and second window portions 34,36.

The first window portion 34 has a first opening 64 therethrough and the second window portion 36 has a second opening 66 therethrough. The first latching assembly 42 is associated with the first opening 64 such that the latching portion 58 of the lever 46 extends outwardly of the first opening 64 and the release portion 60 of the lever 46 extends inwardly of the first opening 64. In a similar manner, the second latching assembly 44 is associated with the second opening 66 such that the latching portion 58 of the lever 46 extends outwardly of the second opening 66 and the release portion 60 extends inwardly of the second opening 66.

A first lock and release mechanism 68 is associated with the access door 30 and the first window portion 34, and second and third lock and release mechanisms 70,72 are associated with the second window portion 36 and the operator's compartment 28. The first, second, and third lock and release mechanism 68,70,72 are substantially similar and include an over center latch 74 and locking pin 76. The over center latch 74 is released from the locking pin 76 when either of the first and second window portions 34,36 are desired to be opened.

A resilient bumper assembly 78 has a first portion 80 connected to one of the first and second window portions 34,36, and a second resilient portion 82 which is adapted to contact the other of the first and second window portions 34,36. The first portion 80 is separated from the second portion 82 to define a spacing 84. The spacing 84 is adjustable by a threaded shaft 86 which is secured within the resilient second portion and threads into the first portion 80. The adjustment of the spacing 84 provides for changing the amount of engagement force between the latching portions 58 of the first and second latching assemblies 42,44.

Each of the first and second window portions 34,36 has an interior surface 88 and a grab handle 90 is connected to the interior surface 88 of each window portion 34,36. The machine operator uses the grab handle to pull the window portion 34,36 closed after the release portion 60 has been released.

INDUSTRIAL APPLICABILITY

With reference to the drawings and the previous detailed description, the subject window latching arrangement 40 is particularly useful with a work machine 10 having a first work implement 16 at the front portion 12 of the machine 10 and a second work implement 18 at the rear portion of the work machine 10. While operating the first work implement 16, the operator can open the first window portion 34, independently of the access door 30, and pivot it toward the second window portion 36. This is accomplished by unlocking the first lock and release mechanism 68. As the first window portion 34 approaches the second window portion 36, the levers 46 of the first and second latching assemblies 42,44 will contact, and the notched area 62 of the latching portions will engage. The window portions 34,36 will remain latched together until the machine operator activates the release portion 60 of the lever 46, which then disengages the notched areas 62. The operator then grabs the grab handle 90 and pulls the first window portion closed and locks it to the access door with the first lock and release mechanism 68.

While operating the second work implement 18, the operator can open the second window portion 36 by unlocking the second and third lock and release mechanism 70,72. The second window portion 36 is then pivoted toward the first window portion 34 until the first and second latching assemblies 42,44 contact and latch together, as described above. Since the first and second latching assemblies 42,44 are substantially similar, and operate in the same manner, the previous description pertaining to the first window portion 34 and operation of the latching assemblies 42,44 is applicable to the second window portion 36 also.

Other aspects, objects and advantages of this invention can be obtained from a study of the drawings, the disclosure, and the appended claims.

I claim:

1. A window latching arrangement for a work machine, comprising:

an operator's compartment on said work machine;

an access door pivotably connected to said operator's compartment, said access door having a first window portion pivotably connected to said access door for opening movement independent of said access door;

a second window portion connected to said operator's compartment' a first latching assembly connected to said first window portion;

a second latching assembly connected to said second window portion, said second latching assembly being in substantial horizontal alignment with said first latching assembly; and a first lock and release mechanism associated with said access door and said first window portion.

2. A window latching arrangement, as set forth in claim 1, wherein said second window portion is pivotably connected to said operator's compartment for opening movement toward and away from said access door, and including a second lock and release mechanism associated with said second window portion and said operator's compartment.

3. A window latching arrangement, as set forth in claim 1, wherein said first window portion has an opening and said first latching assembly is associated with said opening, and including a lever having a latching portion extending outwardly of said opening and a release portion extending inwardly of said opening.

4. A window latching arrangement, as set forth in claim 3, wherein said second window portion has an opening and said second latching assembly is associated with said opening, and including a lever having a latching portion extending outwardly of said opening and a release portion extending inwardly of said opening.

5. A window latching arrangement, as set forth in claim 1, wherein said first and second latching assemblies are substantially similar with each latching assembly including a lever having a latching portion and a release portion, first and second clamping blocks, and a spring associated with said lever for biasing said lever to a first position.

6. A window latching arrangement, as set forth in claim 5, wherein the latching portion of each lever includes a notched area, the notched areas of the latching portions of the first and second latching assemblies being adapted to engage and lock the first latching assembly to the second latching assembly.

7. A window latching arrangement, as set forth in claim 1, including a resilient bumper assembly having a first portion connected to one of said first and second window portions and a second portion adapted to contact the other of said first and second window portions.

8. A window latching arrangement, as set forth in claim 7, wherein the first portion of said bumper assembly is separated from said second portion to define a spacing and including means to adjust said spacing.

9. A window latching arrangement, as set forth in claim 1, wherein each of said first and second window portions has an interior surface and a grab handle is connected to the interior surface of each window portion.

10. A work machine, having front and rear portions comprising:

a first work implement connected to the front portion of said work machine;

a second work implement connected to the rear portion of said work machine;

an operator's compartment on said machine;

an access door pivotably connected to said operator's compartment, said access door having a first window portion pivotably connected thereto for opening movement independent of said access door;

a second window portion pivotably connected to said operator's compartment;

a window latching arrangement including first and second latching assemblies connected to said respective first and second window portions;

first and second lock and release mechanisms associated with said respective first and second window portions and said operator's compartment; and a resilient bumper assembly having a first portion connected to one of said first and second window portions and a second resilient portion adapted to contact the other of said first and second window portions.

11. A work machine, as set forth in claim 10, wherein each of said first and second window portions has an interior surface and a grab handle is connected to the interior surface of each window portion.

12. A work machine, as set forth in claim 10, including a third lock and release mechanism associated with said second window portion and said operator's compartment.

* * * * *